J. C. RINEHART.
SPRING WHEEL.
APPLICATION FILED OCT. 15, 1910.
1,010,688.
Patented Dec. 5, 1911.
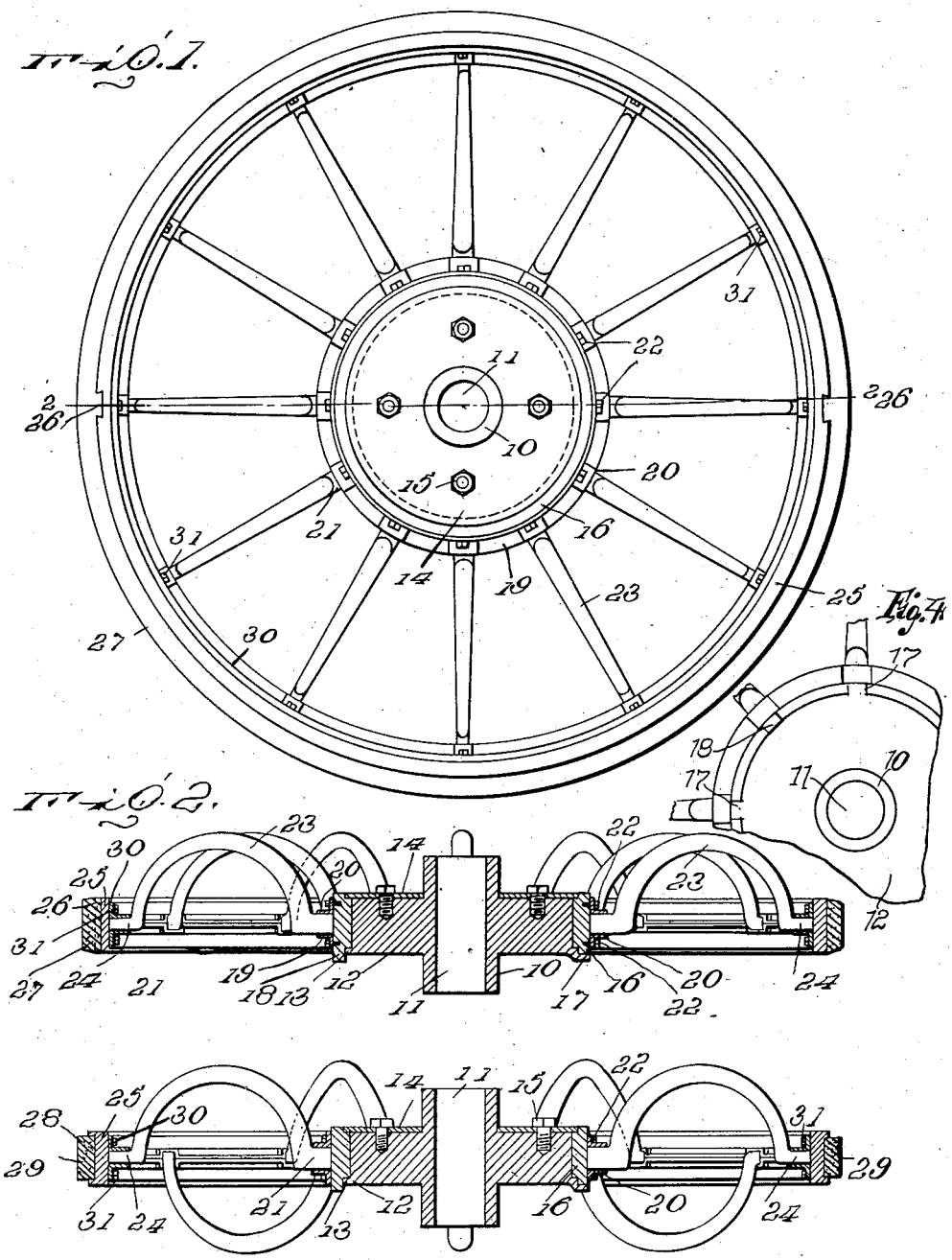

UNITED STATES PATENT OFFICE.

JOHN C. RINEHART, OF WASHINGTON, DISTRICT OF COLUMBIA, ASSIGNOR TO THE RINEHART RESILIENT WHEEL COMPANY, INCORPORATED, OF ALEXANDRIA, VIRGINIA.

SPRING-WHEEL.

1,010,688.   Specification of Letters Patent.   Patented Dec. 5, 1911.

Application filed October 15, 1910. Serial No. 587,141.

*To all whom it may concern:*

Be it known that I, JOHN C. RINEHART, a citizen of the United States, residing at 1713 Lincoln avenue Northeast, Washington, District of Columbia, have invented certain new and useful Improvements in Spring-Wheels, of which the following is a specification.

This invention relates to vehicle wheels and has especial reference to a resilient wheel adapted for use with all types of vehicles.

It is a well understood fact that the common type of wheel used with automobiles and other like vehicles is dependent for its resiliency on what is commonly termed a pneumatic tire.

The principal object of the present invention is to provide an improved form of vehicle wheel wherein the resiliency will be obtained by a novel arrangement of resilient spokes.

A second object of the invention is to provide a novel manner of connecting the resilient spokes to the hub of the wheel so that the spokes will be prevented from yielding in any other manner than that for which they are designed.

A third object of the invention is to provide an improved form of spoke for use in connection with such a wheel.

With the above and other objects in view, as will be hereinafter apparent, the invention consists in general of certain novel arrangements of details and combinations of parts hereinafter fully described, illustrated in the accompanying drawings and specifically set forth in the claims.

In the accompanying drawings like characters of reference indicate like parts in the several views, and; Figure 1 is a side elevation of a vehicle wheel constructed in accordance with this invention. Fig. 2 is a section on the line 2—2 of Fig. 1. Fig. 3 is a section similar to Fig. 2 but showing a modification of the device. Fig. 4 is a detail view showing certain lugs hereinafter referred to.

In the embodiment of the invention shown in the accompanying drawings there is provided a wheel hub 10 of cylindrical form and provided with the usual bore 11 for the reception of the journal of an axle. Intermediate the ends of this hub there is provided a circumferential rib or flange 12 upon one lateral edge of which is a circumferential flange 13. Against the remaining side of the rib 12 is fitted a plate 14, the latter being held in position by means of bolts 15. This plate is of such dimensions that there is formed around the rib a circumferential channel wherein is fitted a sleeve 16, the sleeve, plate and rib being so dimensioned that the sleeve frictionally engages the rib and plate in such manner that the sleeve can only rotate on the rib under such abnormal conditions as may be brought about by the wheel meeting some obstruction or being given some other extraordinary shock which would tend to interfere with the rotation of the wheel rim synchronously with the hub. It will be noted that by means of this sleeve the starting and stopping of the car will be accomplished in a smooth manner, as there will be frictional engagement between the sleeve and collar which would permit a certain yielding and relieve shock.

In order to prevent too great latitude of movement of the sleeve independently of the hub certain limiting means are employed which consist of fingers 17 projecting radially from the hub and lugs 18 projecting laterally from the sleeve and engaged by the fingers when the sleeve has rotated a predetermined extent around the hub.

Extending circumferentially around the sleeve are spoke clamping members 19 which are provided with pockets 20 to receive the inner ends 21 of the spokes, these pockets and ends being preferably of polygonal cross section in order to prevent the rotation of the spokes in the pockets. There has here been shown a construction in which both of the members 19 are attached to the sleeve by bolts 22. The spokes themselves each comprise an inner portion 21, as previously described, which extends radially of the hub, a central portion 23 which is curved in such manner as to have its axis in a plane radial of the hub or in other words is curved laterally of the hub, and an outer radial portion which is in alinement with the portion 21 and is indicated at 24. In the form shown in Fig. 2 the spokes are all curved in the same direction while in the form shown in Fig. 3 the spokes are alternately curved in opposite directions.

The rim of the wheel or felly is shown at 25 and this rim may either have a smooth periphery, be provided with transverse slots 26 to hold a tire 27, or be provided with a channel 28 to receive a tire 29, the last mentioned form being shown respectively in Figs. 1 and 3. Within the rim 25 are internal circumferential clamping members 30 which are provided with pockets for the reception of the outer ends of the spokes and which are held in position by bolts 31. By means of this construction the removal of one of the clamping members 19 and the corresponding clamping member 30 will permit the removal and replacement of any spoke in the event of damage to such spoke.

It will be particularly noted that the inner and outer ends of each spoke are in radial alinement and that each spoke tapers uniformly from end to end.

In the operation of this wheel it is obvious that the ordinary shocks incident to inequalities in the road will be absorbed by the spokes, the latter being of resilient material, and that because of the peculiar arrangement and alinement of the inner and outer ends of the spokes the rim of the wheel will be at all times held in a plane perpendicular to the axis of rotation and lateral deflection thereby prevented. There has thus been provided a simple and efficient device of the kind described and for the purpose specified.

It is obvious that many minor changes may be made in the form and construction of this invention without departing from the material principles thereof. It is not therefore desired to confine the invention to the exact form herein shown and described, but it is wished to include all such as properly come within the scope of the appended claims.

Having thus described the invention, what is claimed as new and is desired to be secured by Letters Patent, is;

1. A spring wheel comprising a hub, a sleeve frictionally but slidably engaged over said hub, a rim, and resilient spokes secured to said rim and sleeve, each of said spokes having a central bowed portion lying in a plane at right-angles to the plane of the wheel; in combination with means to limit the revolution of said sleeve on said hub.

2. A spring wheel comprising a hub, a sleeve frictionally but slidably engaged over said hub, a rim, and resilient spokes secured to said rim and sleeve, each of said spokes having a central bowed portion lying in a plane at right-angles to the plane of the wheel; in combination with fingers projecting radially from said hub, and a lug projecting laterally from said sleeve between said fingers.

In testimony whereof I have hereunto set my hand in presence of two subscribing witnesses.

JOHN C. RINEHART.

Witnesses:
WILLIAM S. JONES,
JOHN H. TORNEY.

Copies of this patent may be obtained for five cents each, by addressing the "Commissioner of Patents, Washington, D. C."